(12) United States Patent
Durvasula

(10) Patent No.: US 7,617,198 B2
(45) Date of Patent: Nov. 10, 2009

(54) GENERATION OF XML SEARCH PROFILES

(75) Inventor: Vijaya Sarathi Durvasula, Bangalore (IN)

(73) Assignee: SAP AG, Walldorf (DE)

( * ) Notice: Subject to any disclaimer, the term of this patent is extended or adjusted under 35 U.S.C. 154(b) by 410 days.

(21) Appl. No.: 11/350,623

(22) Filed: Feb. 9, 2006

(65) Prior Publication Data

US 2007/0185891 A1   Aug. 9, 2007

(51) Int. Cl.
*G06F 17/30* (2006.01)
(52) U.S. Cl. .......................................................... 707/4
(58) Field of Classification Search ............... 707/1–10, 707/100–104.1, 200–206; 705/1, 27, 35, 705/17, 25, 4, 38; 709/220, 225, 203, 219, 709/246; 717/106, 105, 136, 178, 236, 764, 717/810; 726/1, 3
See application file for complete search history.

(56) References Cited

U.S. PATENT DOCUMENTS

| | | | |
|---|---|---|---|
| 6,470,333 B1 * | 10/2002 | Baclawski | 707/3 |
| 6,539,396 B1 * | 3/2003 | Bowman-Amuah | 707/103 R |
| 7,096,224 B2 * | 8/2006 | Murthy et al. | 707/100 |
| 2002/0161745 A1 * | 10/2002 | Call | 707/1 |
| 2003/0130995 A1 * | 7/2003 | Pope et al. | 707/3 |
| 2003/0131016 A1 * | 7/2003 | Tanny et al. | 707/102 |
| 2003/1012613 * | 7/2003 | Lee et al. | 707/100 |
| 2005/0086216 A1 * | 4/2005 | Davis | 707/3 |
| 2006/0100989 A1 * | 5/2006 | Chinchwadkar et al. | 707/3 |
| 2009/0013522 A1 * | 1/2009 | Honda et al. | 29/730 |

* cited by examiner

*Primary Examiner*—Diane Mizrahi
(74) *Attorney, Agent, or Firm*—Kenyon & Kenyon LLP

(57) ABSTRACT

A system for generating a nested field record related to a corresponding data record is described. The system comprises a structured database for storing a plurality of the corresponding data records and a nested field record generator to query the structured database and generate the nested field record according to data selected from the corresponding data record. The nested field record generator also further derives and includes derived data from the corresponding data record in the nested field record.

11 Claims, 2 Drawing Sheets

GENERATION OF XML SEARCH PROFILES

FIELD OF THE INVENTION

The present invention relates to the generation of a nested or hierarchical field record such as in Extensible Markup Language (XML) format. In a particular form, the present invention relates to generating an XML record from a central database for subsequent post processing and searching.

BACKGROUND OF THE INVENTION

Extensible Markup Language (XML) is a powerful platform independent tool for the storage and display of data. As information stored in XML is arranged in a nested or hierarchical format which reflects the underlying structure of the information, this makes it particularly suitable for the storage of data such as personnel information and the like. Additionally, XML is particularly suited to the input and display of information by tools used commonly for the World Wide Web (WWW). Accordingly, there are a number of enterprise resource planning (ERP) and database systems employed to manage the process of recruitment and employee management that employ XML as one data format for storing information related to a candidate which may be easily searched or otherwise post processed.

Referring now to FIG. 1, there is shown an ERP system 100 of the type that employers or specialist recruiters acting on behalf of an employer utilize to manage the process of recruitment of new candidates and also succession planning within an organization. In ERP system 100, a prospective candidate will be able to enter their relevant details into a central structured database 110 using a candidate interface 130. The candidate interface 130 interacts with a database application layer 120 that manages the retrieval of the relevant details in the correct data tables as requested.

A recruiter wishing to obtain information about suitable candidates is able to form a customized information request by employing recruiter customization module 140 that indicates to XML generator 150 to generate candidate search profiles 155 in XML format having this customized information. This information may in one example include only details such as work experience and education where in this case other candidate information is not relevant for a given recruitment task.

Alternatively, the candidate search profiles 155 may be generated by XML generator 150 to contain all relevant data provided by a candidate and in this case the recruiter customization module 140 will customize the capability of the recruiter applications 170 to have access to either all or part of the candidate information provided by the candidate. For example, where the recruiter application 170 involves a searching tool, the recruiter would in a similar scenario to that outlined above, only be able to perform searches of candidate search profiles 155 based on candidate education or work experience.

Candidate search profiles 155 are then indexed by indexer 160 into search engine index 165. This indexing process provides the capability to rapidly rank and search the candidate information. Candidate search profiles 155 are also stored in XML format in database 110. Recruiter applications 170 are then able to post process the information contained in the candidate search profiles 155 by accessing the search engine index 165. One example of a recruiting application 170 would be a searching tool that is able to send search queries in XML format to rank candidate search profiles 155 that have been indexed in search engine index 165 according to predetermined criteria.

Candidates control the accessibility of their information by being able to change their candidate status from a "RELEASED" state to a "LOCKED" state via the candidate interface 130. When a candidate changes their candidate status to the "LOCKED" state, this signals 130A the database application layer 120 to delete the corresponding candidate search profile 156 from the database 110, thereby protecting the privacy of the candidate.

Whilst this approach functions to protect the privacy of the candidate, it also results in the candidate search profile 156 having to be deleted each time the candidate status is changed to the "LOCKED" state and then subsequently regenerated in its entirety if the candidate should choose once again to change their candidate status to "RELEASED". Accordingly, the corresponding data records stored in database 110 and the candidate search profiles 155 generated from these data records are no longer synchronized with resynchronization only occurring when the candidate changes their candidate status to "RELEASED" again.

This can result in potential inconsistencies between other applications which directly access and post process the candidate data records in database 110 that correspond to the generated candidate search profiles 155 and the recruiter applications 170 which directly access the candidate search profiles 155 by virtue of search engine index 165. Additionally, any useful information that could be derived from the locked candidate search profile 156 that would not necessarily violate the privacy of the candidate concerned is lost as this candidate search profile 156 has been deleted.

Another significant disadvantage of this approach is that at the recruiter customizing stage 140, the recruiter is limited to generating or alternatively post processing information in the candidate search profiles 155 that corresponds directly to data fields in the database 110.

SUMMARY OF THE INVENTION

In a first aspect the present invention accordingly provides a system for generating a nested field record related to a corresponding data record, said system comprising a structured database for storing a plurality of said corresponding data records; and a nested field record generator to query said structured database and generate said nested field record according to data selected from said corresponding data record, wherein said nested field record generator further derives and includes derived data from said corresponding data record in said nested field record.

In a second aspect the present invention accordingly provides a method for generating a nested field record related to a corresponding data record stored in a structured database, said method comprising the steps: querying said structured database to select data from said corresponding data record to generate said nested field record; and deriving further derived data from said corresponding data record and including said derived data in said nested field record.

In a third aspect the present invention accordingly provides a computer useable medium having computer readable instructions embodied on said medium for causing a computer to generate a nested field record related to a corresponding data record stored in a structured database according to the method of querying said structured database to select data from said corresponding data record to generate said nested field record; and deriving further derived data from said corresponding data record and including said derived data in said nested field record.

BRIEF DESCRIPTION OF THE DRAWINGS

An embodiment of the present invention will be discussed with reference to the accompanying drawings wherein.

DETAILED DESCRIPTION OF THE INVENTION

Figure 1:
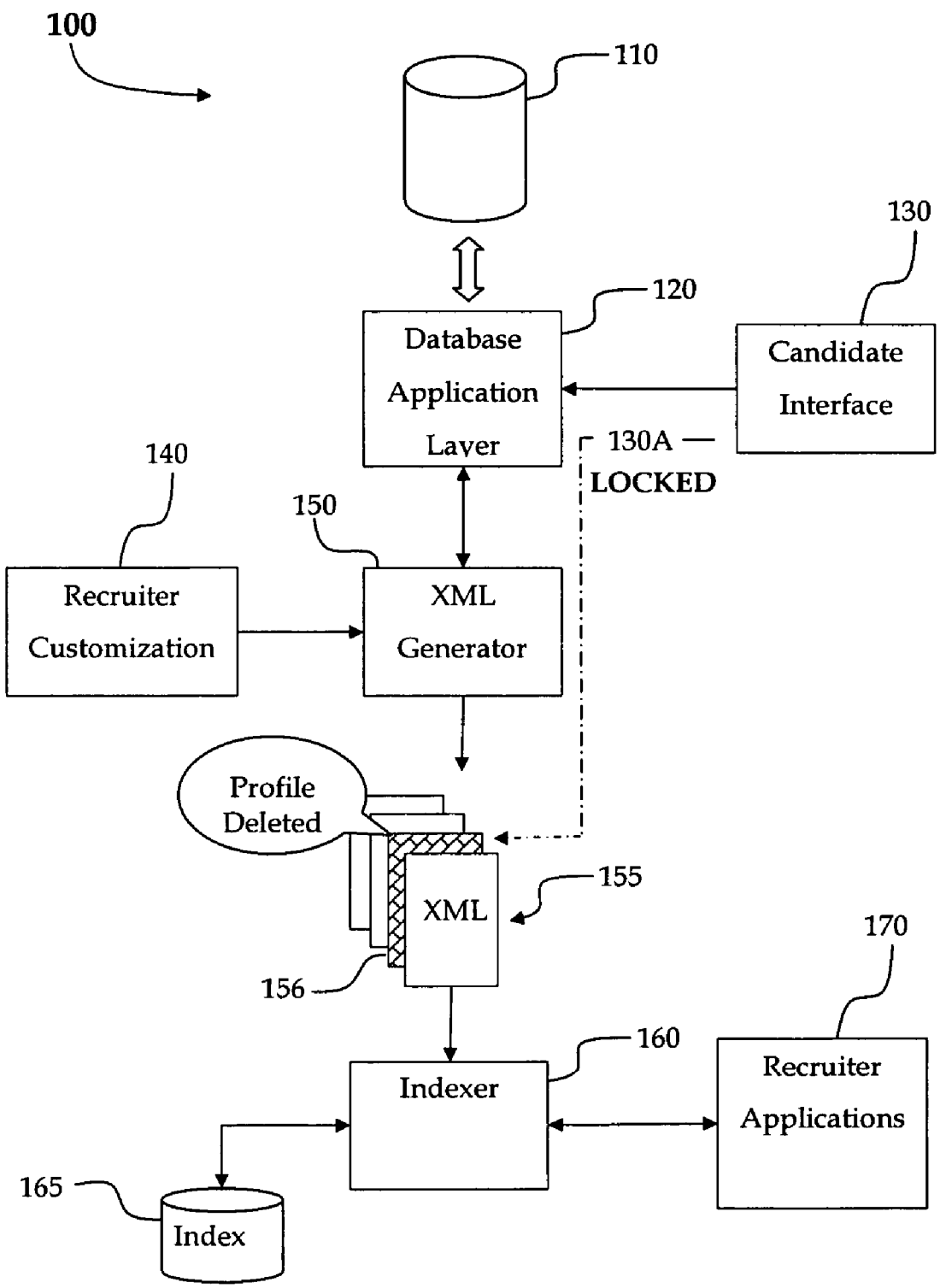
FIG. 1 is a data flow overview of a prior art system for generating a nested field record.
Figure 2:
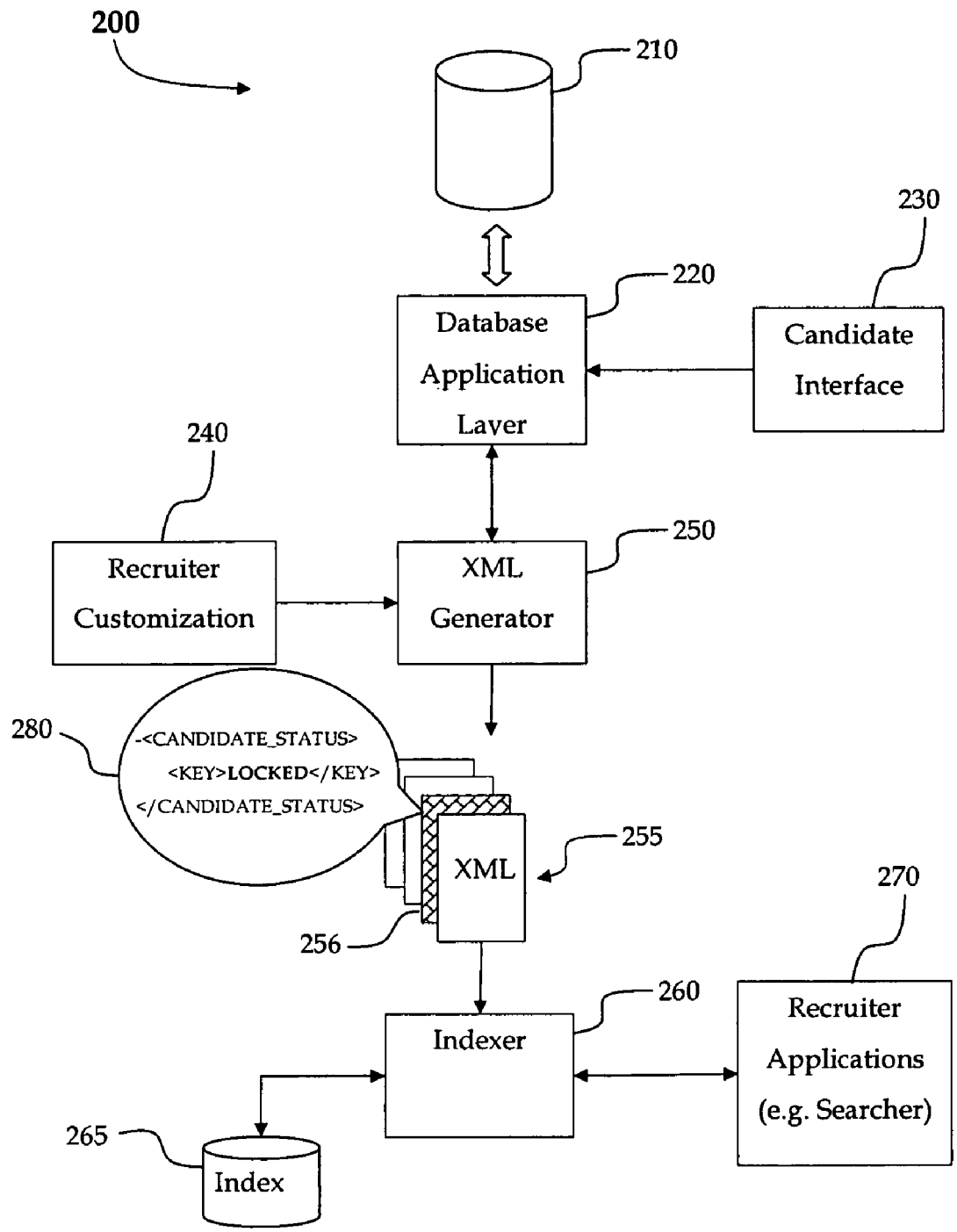
FIG. 2 is a data flow overview of a system for generating a nested field record according to an embodiment of the present invention.

Referring now to FIG. 2, there is shown an ERP system 200 for generating a nested field record related to a corresponding data record according to an embodiment of the present invention. Whilst the present invention is described in relation to an ERP system, it is appreciated that the invention will have other applications consistent with the principles described in the specification.

The ERP system 200 includes a central storage database 210 having a database application layer 220 including routines to allow data to be stored, retrieved and updated in the central storage database 210. Whilst in this embodiment, the central storage database 210 is a SQL database it is appreciated by those skilled in the art that other structural or relational databases are contemplated to be within the scope of the invention. The database application layer 220 may be implemented as a series of object classes that directly access central storage database 210 or may comprise a series of SQL or related calls that manipulate table entries in the central storage database 210.

The ERP system 200 also includes a candidate interface 230 which allows a candidate to enter contact, employment and other relevant details Candidate interface 230 may be implemented as a customized application or have a HTML type interface making it suitable for access by a suitable web browser or the like. In this Embodiment, relatine to the task of candidate recruitment, the candidate enters or provides details to ERP system 200 via candidate interface 230 similar to those details that are typically found in a resume or curriculum vitae. These details typically include contact information, education details, past work experience and a listing of capabilities. A candidate may set a flag to release their details resulting in the attribute candidate status being set as "RELEASED" in the central storage database 210.

When a recruiter wishes to gather data for a given recruitment task, the first step is to customize data that is to be sourced from the central storage database 210. This is due to different recruitment tasks being focused on different types of candidate information. In this process the recruiter employs recruiter customization module 240 which forms a template defining which data is sourced from central storage database 210 to form input information for XML generator 250 which then functions to generate candidate search profiles 255 in XML format. These candidate search profiles 255 are subsequently indexed by indexer 260 onto a search engine index 265. Furthermore candidate search profiles 255 are also stored in XML format in the central storage database 210.

Alternatively, recruiter customization module 240 can customize the behavior of recruitment applications 270 so that whilst candidate search profiles 255 may be generated by XML generator 250 that contain all the information that has been provided by a candidate, only that candidate information related to a given recruitment task will be processed by the recruitment applications 270.

Whilst in this embodiment the nested or hierarchical field records that form the candidate search profiles 255 are in XML format, equally the candidate search profiles 255 may be in another predefined nested field format such as HTML or other proprietary format. The recruiter applications 270 can then access these generated XML records (i.e. the candidate search profiles 255) by accessing the search engine index 265. One example of such a recruiter application 270 is a searcher or searching tool which accesses search engine index 265 to rank candidate search profiles 255 using XML based queries.

According to the present invention, a further XML code segment 280 containing derived data is further generated by the XML generator 250 and included into the candidate search profile 255. Consider a candidate search profile 256 as indicated in FIG. 2. In this example, the derived data relates to the attribute candidate status which on being set to "LOCKED" would typically trigger a routine or object in the database application layer 220 to delete the candidate search profile 256. As such, the attribute candidate status does not relate to the candidate per se but rather is application specific data used to manage access to this candidate's candidate search profile 256.

Whilst in this embodiment, the further XML code segment 280 containing the derived data is generated by the XML generator 250, equally it may be generated by the database application layer 220 or by a newly incorporated object or routine as required.

By incorporating the application specific data "candidate status" in candidate search profiles 255, the recruiter application 270 can be configured to filter out all those candidate search profiles 255, such as candidate search profile 256, which is set to "LOCKED" by the original candidate. As such, candidate search profile 256 does not require deletion, thereby ensuring that the central storage database 210 and the candidate search profiles 255 remain synchronized. Should the candidate change their candidate status back to "RELEASED" using the candidate interface 230, then the database application layer 220 signals the XML generator 250 to regenerate the candidate search profile 256. Alternatively, the XML generator 250 can overwrite and reinsert the relevant XML code segment 280 into the candidate search profile 256.

The additional XML code segment 280 is tagged <HIDDEN_INFO> and in this embodiment includes an XML tag <CANDIDATE_STATUS> which takes the values RELEASED or LOCKED and is structured as set out below:

```
<HIDDEN_INFO>
    <CANDIDATE_STATUS>
        <KEY>|</KEY>
    </CANDIDATE_STATUS>
</HIDDEN_INFO>
```

According to the present invention, further derived data that is not necessarily application specific, such as the example <CANDIDATE_STATUS> described above, may be derived from the candidate data which is stored in the central database 210.

In this manner, the structure of the central database 210 need not be altered to include a new field as the information contained in this field can be derived from the original candidate data when the candidate search profiles 255 are being generated.

An example of such derived data can include whether a candidate is internal or external to the organization for a given recruitment task. This information can be very useful where, in the event of succession planning, only candidates internal to the relevant organization are required as part of any searching of the candidate search profiles 255. This information can be derived from checking for the presence of employee id numbers or alternatively, filtering on the current employer for a given candidate. Clearly, this derivation process can be tailored to incorporate the information that is to be required in the candidate search profiles 255 for subsequent post processing such as in searching by the recruiter applications 270.

As an example, the XML code segment 280 described above can be modified to include a new XML tag <CANDIDATE_TYPE> which takes one of the values INT (corresponding to an internal candidate) or EXT (corresponding to an external candidate). XML code segment 180 is then structured as follows:

```
<HIDDEN_INFO>
    <CANDIDATE_STATUS>
        <KEY>|</KEY>
    </CANDIDATE_STATUS>
    <CANDIDATE_TYPE>
        <KEY>|</KEY>
    </CANDIDATE_TYPE>
</HIDDEN_INFO>
```

By inclusion of this <HIDDEN_INFO> XML code segment 180, recruiter applications 270 are then able to filter out candidates according to both their status and type. As an example, for the task of succession planning, a recruiter application 270 such as a searcher first searches the candidate search profiles 255 only for those candidates who have released their candidate search profile and are also internal to the relevant organization or business entity.

As would be apparent to those skilled in the art, one of the primary advantages of the present invention is that searchable data may be included in the generated candidate search profile 255 which either is not directly defined in the central database 210 or may relate to further post processing by recruiter applications 270. One common example of this post processing, as already highlighted above, is an XML based search query by a searcher forming part of the recruiter applications 270. As would also be apparent to those skilled in the art, the derived data that may be further included in the candidate search profiles 255 is not limited to the examples described, but may include any other relevant fields that relate to a particular recruitment task.

One such example includes incorporating information pertaining to tracking those candidates search profiles 155 that correspond to candidates who have submitted applications for a specific job posting or job requisition. In this example, a new XML tag <REQUISITION> that includes a requisition object identifier that identifies the specific job posting or job requisition that a candidate has submitted an application for is defined. This will then form part of the derived data that is included in XML code segment 280. This then allows a recruiter to rank candidate search profiles 255 in the context of a specific job posting or requisition.

An example of a full candidate search profile 255 incorporating an <HIDDEN_INFO> XML code segment 180 according to the present invention that is readily indexed by indexer 260 and hence searchable by an XML based searcher forming part of the recruiter applications 270 is set out below:

```
<?xml version="1.0" encoding="iso-8859-1" ?>
<INT_CAND>
    <CANDIDATE_CENTRAL_PERSON>
        <FIRSTNAME>
            <VALUE>JOHN</VALUE>
        </FIRSTNAME>
        <LASTNAME>
            <VALUE>DOE</VALUE>
        </LASTNAME>
        <MARITALSTATUS>
            <KEY/>
            <VALUE/>
        </MARITALSTATUS>
        <NATIONALITY>
            <KEY />
            <VALUE/>
        </NATIONALITY>
        <SEX>
            <KEY>0</KEY>
            <VALUE />
        </SEX>
    </CANDIDATE_CENTRAL_PERSON>
    <CANDIDATE_INFORMATION>
        <CLASSIFICATION>
            <KEY>26.00</KEY>
            <VALUE>26.00</VALUE>
        </CLASSIFICATION>
        <TGROUP>
            <KEY>0000</KEY>
        </TGROUP>
    </CANDIDATE_INFORMATION>
    <HIDDEN_INFO>
        <CANDIDATE_STATUS>
            <KEY>RELEASED</KEY>
        </CANDIDATE_STATUS>
        <CANDIDATE_TYPE>
            <KEY>EXT</KEY>
        </CANDIDATE_TYPE>
        <REQUISITION>
            <KEY>01NB50002438</KEY>
        </REQUISITION>
    </HIDDEN_INFO>
</INT_CAND>
```

A brief consideration of the above described embodiment will indicate that the invention provides an extremely simple and effective means to include further information in a candidate search profile to aid and facilitate a given recruitment task such as succession planning and the like, thereby providing a distinct advantage in flexibility over prior art systems.

Although an embodiment of the method and system of the present invention is described in the foregoing detailed description, it is understood that the invention is not limited to the embodiment disclosed, but is capable of numerous rearrangements, modifications and substitutions without departing from the scope of the invention as set forth and defined by the following claims.

What is claimed is:

1. A system comprising:
   a computer memory including a structured database storing a plurality of data records, each data record comprising a plurality of data fields, at least one of the data fields being a hidden data field, at least one of the hidden data fields storing data indicating whether the data record is viewable by a third party; and
   a computer processor operative to:
   receive a first query identifying data record(s) containing specified data and data field(s) in the data record(s);

extract a data field name and data field value from each identified data field in the identified data record(s);

create a nested XML data record for each identified data record, the nested data record comprising the identified data field names and values of the identified data record and the hidden data fields of the identified data record;

index each nested XML data record onto a search engine index;

responsive to a second query of the XML data records indexed on the search engine index, report data responsive to the second query to the third party from the XML data records having data in the at least one hidden data fields indicating that the data record is viewable by the third party;

otherwise, not reporting the data responsive to the second query to the third party;

responsive to a change in the data indicating whether the data record is viewable by the party, propagate the change in the data to the at least one hidden data field of the data record in the structured database and the at least one hidden data field of the nested XML data record;

responsive to further queries of the XML data records indexed on the search engine index, report data responsive to the further queries to the third party from the XML data records having data in the at least one hidden data fields indicating that the data record is viewable by the third party; and otherwise, not reporting the data responsive to the further queries to the third party.

2. The system of claim 1, further comprising a post processor to post process said nested XML data record.

3. The system of claim 2, wherein said nested XML data record is stored in said structured database.

4. The system of claim 3, wherein said post processor comprises an indexer to index a plurality of nested XML data records stored in said structured database.

5. The system of claim 4, wherein said post processor comprises a searcher to query said indexer to locate a nested XML data record according to a predetermined criteria.

6. A computer-implemented method comprising:

receiving a first query identifying data record(s) in a structured data base containing specified data and data field (s) in the data record(s);

extracting a data field name and data field value from each identified data field in the identified data record(s);

using a computer processor to create a nested XML data record for each identified data record, the nested data record comprising the identified data field names and values of the identified data record and the hidden data fields of the identified data record;

indexing each nested XML data record onto a search engine index;

responsive to a second query of the XML data records indexed on the search engine index, reporting data responsive to the second query to the third party from the XML data records having data in the at least one hidden data fields indicating that the data record is viewable by the third party;

otherwise, not reporting the data responsive to the second query to the third party;

responsive to a change in the data indicating whether the data record is viewable by the party, propagating the change in the data to the at least one hidden data field of the data record in the structured database and the at least one hidden data field of the nested XML data record;

responsive to further queries of the XML data records indexed on the search engine index, reporting data responsive to the further queries to the third party from the XML data records having data in the at least one hidden data fields indicating that the data record is viewable by the third party; and otherwise, not reporting the data responsive to the further queries to the third party.

7. The system of claim 6, further comprising a post processor to post process said nested XML data record.

8. The system of claim 7, wherein said nested XML data record is stored in said structured database.

9. The system of claim 8, wherein said post processor comprises an indexer to index a plurality of nested XML data records stored in said structured database.

10. The system of claim 9, wherein said post processor comprises a searcher to query said indexer to locate a nested XML data record according to a predetermined criteria.

11. An article of manufacture comprising a computer useable medium having computer readable instructions embodied on the medium that, when executed by a computer processor, cause the processor to perform a method comprising:

receiving a first query identifying data record(s) in a structured data base containing specified data and data field (s) in the data record(s);

extracting a data field name and data field value from each identified data field in the identified data record(s);

using a computer processor to create a nested XML data record for each identified data record, the nested data record comprising the identified data field names and values of the identified data record and the hidden data fields of the identified data record;

indexing each nested XML data record onto a search engine index;

responsive to a second query of the XML data records indexed on the search engine index, reporting data responsive to the second query to the third party from the XML data records having data in the at least one hidden data fields indicating that the data record is viewable by the third party;

otherwise, not reporting the data responsive to the second query to the third party;

responsive to a change in the data indicating whether the data record is viewable by the party, propagating the change in the data to the at least one hidden data field of the data record in the structured database and the at least one hidden data field of the nested XML data record;

responsive to further queries of the XML data records indexed on the search engine index, reporting data responsive to the further queries to the third party from the XML data records having data in the at least one hidden data fields indicating that the data record is viewable by the third party; and otherwise, not reporting the data responsive to the further queries to the third party.

* * * * *